United States Patent [19]

Yamazaki et al.

[11] Patent Number: 4,974,939

[45] Date of Patent: * Dec. 4, 1990

[54] LIQUID CRYSTAL DEVICE HAVING ELECTRODE STRIPS IN THE PERIPHERAL SEAL

[75] Inventors: Shunpei Yamazaki, Tokyo; Akira Mase, Atsugi; Hiroyuki Sakayori, Machida, all of Japan

[73] Assignee: Semiconductor Energy Laboratory Co., Ltd., Atsugi, Japan

[*] Notice: The portion of the term of this patent subsequent to Aug. 8, 2006 has been disclaimed.

[21] Appl. No.: 283,794

[22] Filed: Dec. 13, 1988

Related U.S. Application Data

[62] Division of Ser. No. 82,544, Aug. 7, 1987, Pat. No. 4,854,675.

[30] Foreign Application Priority Data

Aug. 8, 1986 [JP] Japan .................................. 61-186201

[51] Int. Cl.$^5$ .............................................. G02F 1/133
[52] U.S. Cl. ........................................ 350/336; 350/343
[58] Field of Search ................................ 350/336, 343

[56] References Cited

U.S. PATENT DOCUMENTS 4,370,194  1/1983  Shaver et al. ...................... 350/336
4,412,214  10/1983  Tanaka et al. ...................... 350/336

Primary Examiner—Stanley D. Miller
Assistant Examiner—Anita Pellman Gross
Attorney, Agent, or Firm—Sixbey, Friedman, Leedom & Ferguson

[57] ABSTRACT

An improved liquid crystal device for display is disclosed. The device is comprised of a pair of substrates on whose insides a number of electrode strips are formed in a matrix. The electrode strips are formed also near the periphery portions of the substrates which are unnecessary for the pixels of the display. By virtue of the excess electrode strips, joining the substrates can be done without special attention to the coincidence of the substrates.

5 Claims, 3 Drawing Sheets

LIQUID CRYSTAL DEVICE HAVING ELECTRODE STRIPS IN THE PERIPHERAL SEAL

This is a continuation application of Ser. No. 07/082.544 filed Aug. 7, 1987 now U.S. Pat. No. 4,854,675.

BACKGROUND OF THE INVENTION

This invention relates to a liquid crystal device and a method for same.

Liquid crystal devices have been utilized for microcomputers, wordprocessors, television sets and so forth, as displays thereof. Such a display comprises a pair of substrates with a liquid crystal layer inbetween, and electrode arrangement to apply an electric field to the liquid crystal layer. The electrode arrangement is divided into a plurality of sections by which pixels of the display are formed. With a suitable voltage applied to a particular section of the electrode, a corresponding portion of the liquid crystal layer is subjected to electric field. Namely, in correspondence with the direction of the electric field or whether or not the voltage is applied, the liquid crystal changes its optical characteristics and then images or characters are displayed.

The electrode arrangement is for example comprised of a plurality of first electrode strips arranged in a X direction on the inside of one substrate, and a plurality of second electrode strips arranged in a Y direction on the opposed inside of the other substrate. The strips are formed by lithography with masks (photoresist). Even if the pattern of the electrodes is comparatively simple, the photoetching has to be carried out with special accuracy. Because of this the lithography process requires many steps and eventually the price of the liquid crystal display rises.

To cope with the conventional shortcomings, the applicant has proposed an improved process in which a laser beam having a linear cross section is radiated to a transparent conductive film prepared on a substrate surface other than the periphery, and then the irradiated linear portion of the film is removed by vaporization, so that the remaining conductive film forms electrodes or leads. With this process, dispensed with are a coating step, a prebaking step, an exposure step, a developing step, a postbaking step, an etching step and a step of removing the coated photoresist.

Anyway, it is required in accordance with prior art to mate a pair of substrates and to form electrode pads with high special accuracy, while preparing a connection area for an external flexible connector of a PCB (print circuit board). For this reason, a spacial margin must be provided adjacent to a sealing resin layer of a panel, as designated by 9 in FIG. 1.

FIG. 1 is a cross section view showing a prior art configuration of a liquid crystal display. The liquid crystal device is provided with a plurality of first electrode strips 2' elongated in the direction perpendicular to the drawing sheet, and a plurality of second electrode 2 strips elongated in the lateral direction, with a liquid crystal layer 5 disposed between a pair of substrates 1 and 1'. Between the electrode arrangement 2 and 2' and a sealing member 6, a margin 9 is designed so that the sealing member 6 shall not extend on the electrode strips 2 and 2'. If the member 6 partially hides the electrode strips, liquid crystal is pushed away from a corresponding portion of the panel and therefore the corresponding displaying portion can not work. The width of the margin is, e.g., 3 to 5 mm. The margin, however, has no function in the finished product. Rather the size of the display is made large by this margin in comparison with the net displaying area of the liquid crystal panel.

Further, in such a flexible electrode circuit, the electrode strips are arranged only with distances of about several hundred micrometers, and thereby the substrates have to be mated with high skill and particular care. This makes the product expensive also due to decreased yield of the product.

SUMMARY OF THE INVENTION

It is therefore an object of the invention to provide a liquid crystal device having a large effective area.

It is another object of the invention to provide a compact liquid crystal device.

It is a further object of the invention to provide a liquid crystal device which can be easily manufactured.

DETAILED DESCRIPTION OF THE PREFERRED EMBODIMENT

Figure 1:
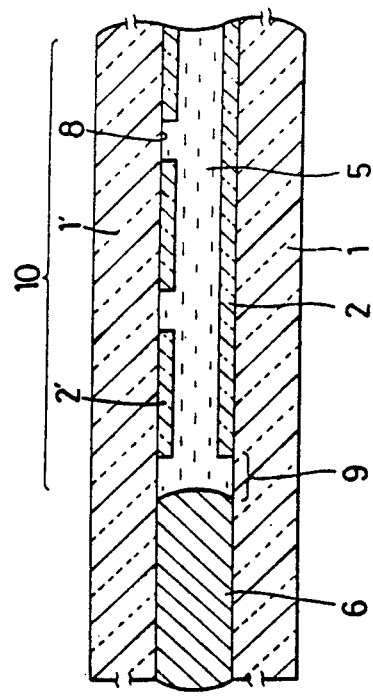
FIG. 1 is a cross section view showing a prior art liquid crystal device.
Figure 2:
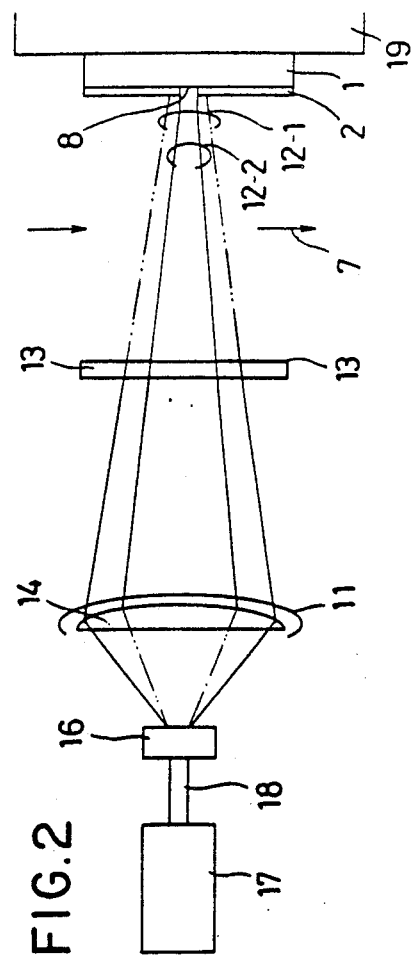
FIG. 2 is a block diagram showing a manufacturing process of a liquid crystal device in accordance with the present invention.

Referring to FIG. 2, patterning of an electric arrangement in accordance with the present invention is explained. A substrate, e.g., a glass substrate, with a transparent conductive film, e.g., made of $SnO_2$ (Eg.=3.5 eV) to be processed is mounted on a base 19. Opposing to the substrate 1, an optical system is arranged approximately on a line normal to the surface of the substrate to be processed. The substrate is irradiated with a laser beam with 248 nm in wavelength and with 5.0 eV in photon energy, which is emitted from an eximer laser 17 using KrF (distributed from Questec Inc.), expanded by an expander 16 in one direction, contracted through a convex cylindrical lense 14 made of artificial quartz, and shaped through a mask 13. The laser beam has a rectangular cross section generally when emitted from an eximer laser. Assuming the efficiency to be 3%, the energy of the laser beam from the laser 17 is 350 mJ/sec. The mask is made of a quartz pane whose rear surface is partially provided with shading material to form a silt through which the laser beam can be shaped. The shading material is preferably a heat resistant material such as chromium, $MoSi_2$ or the like. The laser beam is first generated with a section area of 16 nm×300 nm, next expanded to 16 mm×300 mm on the convex lens 14. The power density of the laser beam on the convex lens 14 is $7.3 \times 10^{-2}$ mJ/mm². Because the optical energy gap is 5.0 eV, the transparent film can sufficiently absorb the photon energy and be selectively removed.

The laser beam passing through the convex lens is contracting at such a proportion that, if it were not for the mask 13, the shorter side length of the rectangular cross section would be 100 microns on the substrate 1. With the mask 13, the laser beam is shaped to have a rectangular cross section 30 cm long 20 micron wide. The laser beam is radiated intermittently with the pulse width of 20 nanoseconds at 1 to 100 Hz, e.g., 10 Hz. Once treated with the pulsed beam, the transparent film is made chalky white and formed into fine powder. The irradiated portion of the film is removed by ultrasonic cleaning (the frequency is 20 KHz) for 1 to 10 minutes in water solution of aceton. According to experimental, no damage was observed on the underlying substrate.

Figure 3A:
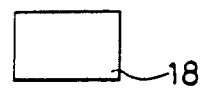
FIGS. 3(A) to 3(E) are explanatory diagrams showing cross sections of laser beams.
Figure 3B:
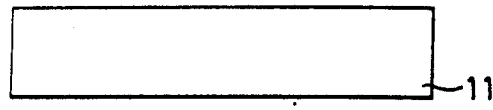
Figure 3C:
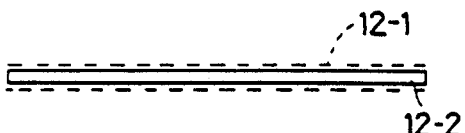
Figure 3D:
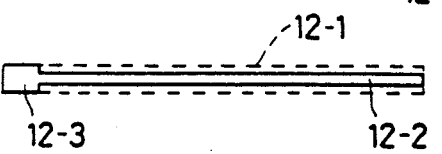
Figure 3E:

Referring to FIGS. 3(A) to 3(E), the shaping of the laser beam is explained. Laser beam emitted from the laser having a rectangular cross section as shown in FIG. 3(A) is expanded in a lateral direction as shown in FIG. (B). The periphery 12-1 of the expanded laser beam is removed with the mask 13 to obtain a desired cross section 12-2 according to which the conductive film is patterned, as shown in FIG. 3(C). The width of the laser beam 12-1 on the mask 13 prior to the removal is 100 microns. The width of the laser beam 12-2 passing through the mask 13 is 20 microns. The periphery of the laser beam can leave without being removed at at least one end as shown in FIG. 3(D). In this case, there can exist no mask at the position corresponding to the end. Similar configuration of laser beam can be obtained also be removing the complete perimeter of the expanded laser beam as shown in FIG. 3(E). FIG. 3(E) is drawn as an expanded view in comparison with FIGS. 3(C) and 3(D).

Figure 4A:
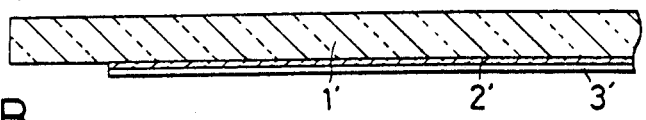
FIGS. 4(A) to 4(D) are partial views showing a liquid crystal display in accordance with the present invention.
Figure 4B:
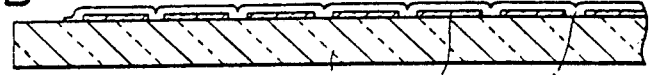
Figure 4C:
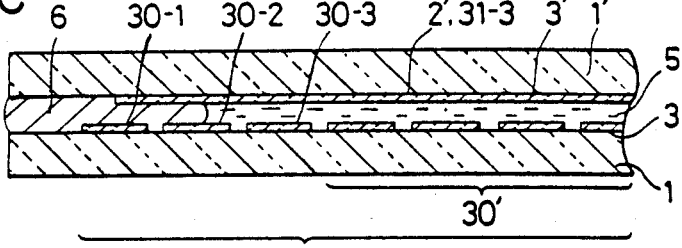
Figure 4D:
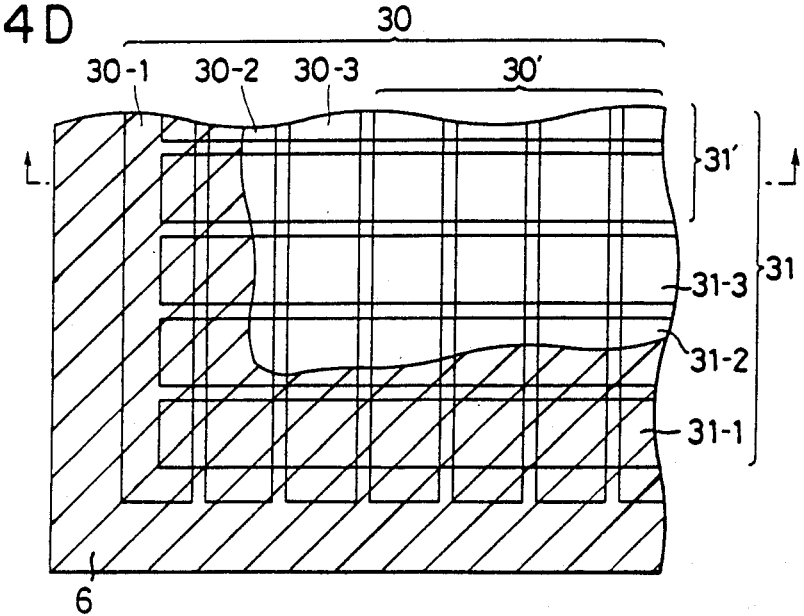

Referring to FIGS. 4(A) to 4(D), a liquid crystal device is illustrated. In the figure, the liquid crystal device for display comprises a pair of glass substrates 1 and 1', a plurality of first electrode strips 2' which are elongated along a X direction and separated from each other, a plurality of second electrode strips 2 which are elongated along a Y direction and separated from each other, oriented films 3 and 3' provided on the inside surfaces of the substrates, a liquid crystal layer 5, and sealing member 6 made of an organic resin. The electrode strips 2 and 2' are formed on the substrates 1 and 1' respectively as shown in FIG. 4(A) and 4(B) by repeatedly making use of the pulsed laser as explained in conjunction with FIGS. 3(A) to 3(E). The substrates 1 and 1' are joined in a manner that the sealing member covers the periphery part of the electrode arrangement 2 and 2' as shown in FIG. 4(C). In this figure, the second electrode strip 30-3 and the first electrode strip 31-3 can be marginal, so that the effective electrode strips are as designated with 30' and 31'. Because of inaccurate connection of the electrode strips with a peripheral circuit, the first electrode strip 31-3 and the second electrode strip 30-3 are not used. However, the number of such useless electrode strips may be increased or may not be provided. Anyway, in accordance with this invention, it is not necessary to join substrates in exact coincidence. Because of this, the display can be manufactured at a low price by a facilitated process.

While the present invention is described in conjunction with a preferred embodiment, the invention should not be limited to the particular example but only to the appended claims. Many modifications and variations may occur to those skilled in the art. Although the embodiment is provided with a pair of transparent substrates, one set of the first and second electrode strips may be reflective by making use of a metal to prepare reflective surfaces on which incident light reflects, while the other strips are transparent. In that case, the liquid crystal display requires only one polarizing plate, and therefore the device can be cheaper. Further, color filters can be provided for the liquid device to make it a color display.

What is claimed is:

1. A liquid crystal device comprising:
   a transparent substrate;
   a plurality of first electrode strips provided on said transparent substrate, elongated along an X direction and electrically isolated with respect to each other;
   an opposed substrate;
   a plurality of second electrode strips provided on said opposed substrate, elongated along an Y direction and electrically isolated with respect to each other;
   a liquid crystal layer disposed between said substrates; and
   a sealing member for sealing the perimeter of said substrates;
   said device characterized in that said first and second electrode strips are provided also on the perimeter sealed by said sealing member and wherein said electrode strips terminate in their ends which are sealed by said sealing member.

2. A device of claim 1 wherein said device is a liquid crystal display.

3. A device of claim 2 wherein a plurality of pixels are defined between said first and second electrode strips, each pixel being formed between one of said first strips and one of said second strips.

4. A device of claim 3 wherein said pixels are formed only between the strips other than those in contact with said sealing member and those adjacent thereto.

5. A device of claim 1 wherein said sealing member is made of an organic resin.

* * * * *